Jan. 10, 1967  L. V. KUNKEL ET AL  3,297,409
SULFUR RECOVERY APPARATUS AND METHOD

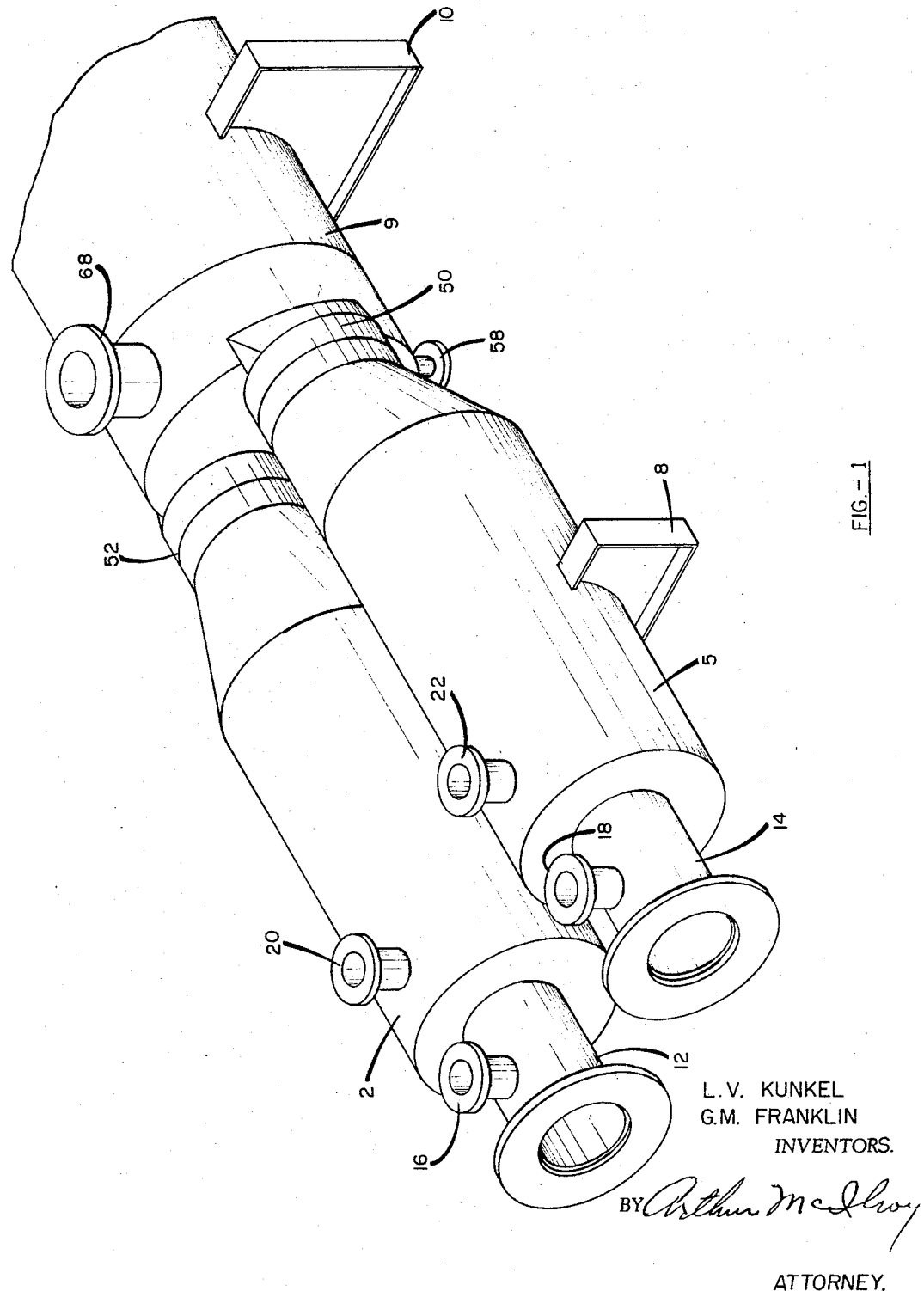

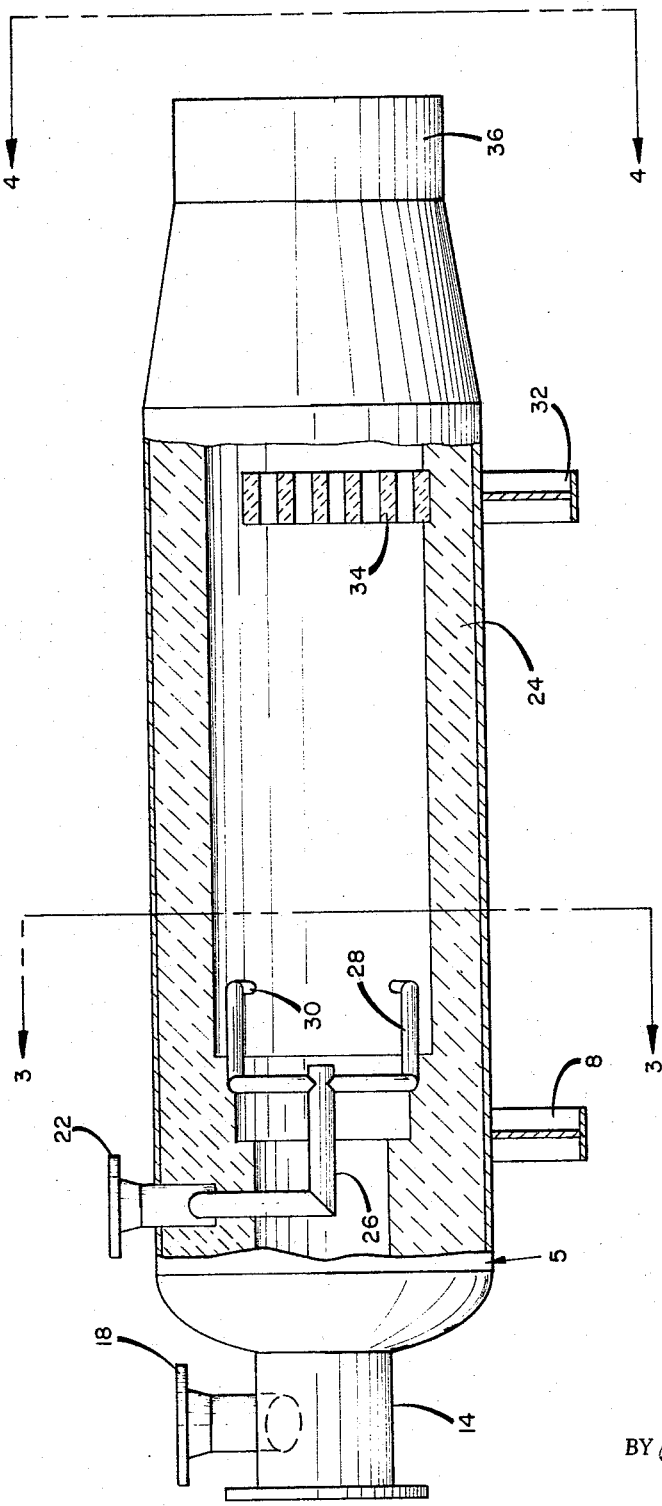

Filed Aug. 14, 1963  5 Sheets-Sheet 3

L.V. KUNKEL
G.M. FRANKLIN
  INVENTORS.

BY Arthur McIlroy

ATTORNEY.

L.V. KUNKEL
G.M. FRANKLIN
INVENTORS.

BY Arthur McIlray
ATTORNEY.

G.M. FRANKLIN
L.V. KUNKEL
        INVENTORS.

BY Arthur McElroy

ATTORNEY.

tion of sulfur, is released in the first converter. There is, of course, no such heat release in the boiler because essentially all of the $H_2S$ introduced at that stage of the process is burned to $SO_2$. Accordingly, the greatest conversion to free sulfur, e.g. about 65 percent, occurs in the first converter and, as would be expected, is accompanied by a greater release of heat than occurs at the corresponding stage in the straight-through process. Thus, feed gas preheated to 450° F. flowing to the first converter is withdrawn therefrom at temperatures of the order of 750° F. Generation of such temperatures not only may require special alloys for construction of the converter, but causes a reduction in the free sulfur yield secured as well.

3,297,409
SULFUR RECOVERY APPARATUS AND METHOD
Lorenz V. Kunkel and George M. Franklin, Tulsa, Okla., assignors to Pan American Petroleum Corporation, Tulsa, Okla., a corporation of Delaware
Filed Aug. 14, 1963, Ser. No. 302,107
5 Claims. (Cl. 23—225)

The present invention relates to a novel method and apparatus for recovering elemental sulfur from a gas containing $H_2S$. More particularly, it is concerned with an improved method and means for recovering sulfur from $H_2S$-containing gases that are difficult to burn.

At present, two procedures are employed commercially for the recovery of free sulfur from sour gas streams. In one type of operation, i.e., the "straight-through" process, all of the feed is introduced into a furnace-boiler together with sufficient air or other source of free oxygen to oxidize one-third of the hydrogen sulfide in the feed to sulfur dioxide. Where the reactants are held above a temperature of 1200° F. for sufficient time, a substantial conversion to free sulfur is obtained without the use of catalyst. Products of this reaction are cooled in a boiler or condenser where produced sulfur is separated. The resulting reaction mixture is then injected into a reaction zone filled with a suitable catalyst, where additional conversion of hydrogen sulfide to free sulfur is obtained. The gaseous products are then usually sent through an economizer or condenser, or introduced into a liquid sulfur scrubbing unit. The unreacted gases taken off the scrubber overhead line are then adjusted to a temperature of from about 400° to 450° F. and sent to a second reaction zone. The products from this reactor are than led to a second condenser scrubber to recover free sulfur therefrom.

The other principal method of recovering free sulfur, commonly referred to as the split-flow process, involves dividing the feed stream and separately burning one-third thereof to sulfur dioxide, after which the latter is combined with the remaining two-thirds of the original feed gas to give a mixture roughly equivalent to that produced when all of the gas is passed through the boiler in the manner generally described above. With a process of this sort using two converters, the method of processing the stream through the system and recovering free sulfur is substantially the same as is involved when the reaction mixture is prepared by introducing all of the feed gas into a furnace and burning one-third of said gas to sulfur dioxide.

Of the two methods, the one in which all of the gas passes through the firing tube of the boiler and one-third of it burns to $SO_2$ is the more desirable because the bulk of the heat of reaction between $SO_2$ and $H_2S$ is released in the boiler where from 60 to 70 percent of the recovered sulfur is generally formed. One principal advantage of this fact is that when the boiler effluent is subsequently transferred to a catalytic converter, the temperature rise experienced in the converter is usually less than 175° F. Thus, in such cases the feed to the first converter enters at a temperature of about 450° F. and is withdrawn at a temperature of about 610° F. Because of this relatively low peak temperature, it is possible to use cheaper materials of construction, e.g. carbon steel, in fabricating the converter, or converters, employed. Also, because the reaction tends to approach equilibrium at these lower temperatures, higher conversions to free sulfur are realized in the first converter.

On the other hand, in the situation where only one-third of the acid gas feed is introduced into the boiler, burned to $SO_2$ and later combined with the remaining two-thirds of the bypassed feed stream prior to entering the first converter, the bulk of the heat of reaction, due to formation of sulfur, is released in the first converter. There is, of course, no such heat release in the boiler because essentially all of the $H_2S$ introduced at that stage of the process is burned to $SO_2$. Accordingly, the greatest conversion to free sulfur, e.g. about 65 percent, occurs in the first converter and, as would be expected, is accompanied by a greater release of heat than occurs at the corresponding stage in the straight-through process. Thus, feed gas preheated to 450° F. flowing to the first converter is withdrawn therefrom at temperatures of the order of 750° F. Generation of such temperatures not only may require special alloys for construction of the converter, but causes a reduction in the free sulfur yield secured as well.

From these facts, it will be apparent that the last-mentioned process is never the preferred one for recovering sulfur from sour gas, but in the past has been used in some cases because the composition of the feed gas was such that combustion could not be properly supported where all of the feed was run through the boiler firing tube.

Other difficulties encountered with current sulfur recovery plant designs have been concerned with the fluctuation in throughput rates. Thus, in plants where a portion of the furnace or boiler effluent is extracted to preheat the acid feed gas to the converters, difficulty is encountered in operations if throughput rates fall below about 50 percent of design since the cooling area in the first and second passes of the boiler is constant and heat release is proportional to the throughput. Therefore, at lower processing rates, low reheat temperatures result in a requirement for a larger percentage of reheat vapors to each converter. This causes reduced sulfur conversion and an increased tendency to foul the catalyst with free sulfur.

Accordingly, it is an object of our invention to provide a method by which the so-called straight-through process can be applied to our gas streams lean in combustibles as well as to streams that will readily support combustion. It is another object of our invention to provide apparatus suitable for burning one-third of the introduced $H_2S$ to $SO_2$ while maintaining the temperature of the resulting product gas at the desired level over wide fluctuations in feed gas throughput rates. It is another object of our invention to recover substantially increased amounts of sulfur from sour gas streams by the "straight-through" method that in the past could only be processed by the "split-flow" method.

For a better understanding of our invention, there is shown in the accompanying drawings a series of embodiments where:

FIGURE 1 is an isometric view of dual firing tunnels connected to a boiler of novel design;

FIGURE 2 is an elevational view, partly in section, of the firing tunnel design;

Briefly, an embodiment of our invention comprises a combination sulfur-burner-combustion chamber system which permits approximately 40 percent of the acid gas to flow through the burner with just enough air for combustion of 33 percent of all the acid gas. The products of this combustion react with the remaining 60 percent of the acid gas in a noncatalytic reaction zone of the firing tunnel. This arrangement permits operation of the "straight-through" process on gases which will not support combustion in the usual "straight-through" design. The use of this design results in the following advantages over the usual "split-flow" process normally used on such gases having poor combustion characteristics:

(1) Higher yields of sulfur due to use of the noncatalytic reactor upstream of the catalytic converters.

(2) Higher yields due to lower converter temperatures.

(3) Lower cost due to more heat transfer in the high temperature transfer zone.

(4) Greater production of high pressure steam.

(5) Simplified operation from the standpoint of control.

Also, it is within the scope of our invention to separate the feed gas into two or more streams which are each fed into separate firing tunnels, one or more of which may be deactivated, if necessary, to permit low gas rates to be processed at high plant efficiency without fouling the catalyst. The deactivated tunnel(s), however, should be purged and kept hot by use of a suitable pilot flame. Such a design provides for maximum operating flexibility at high conversion without shutdown of equipment for modification, as has been required in the past.

Figure 4:
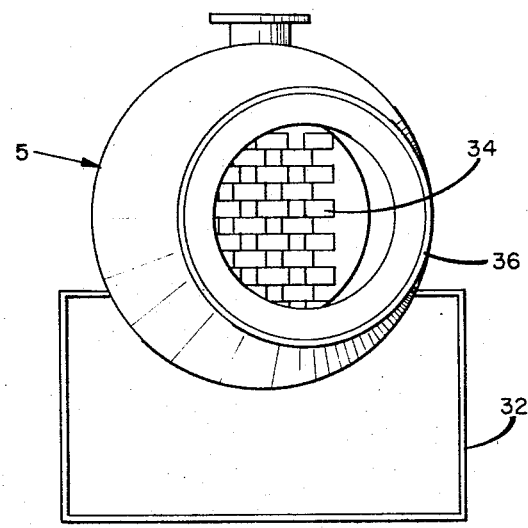
FIGURE 4 is a view of the (rear) end of firing tunnels shown in FIGURES 1 and 2 illustrating details of the structure which fits on to the front end of the boiler.
Figure 3:
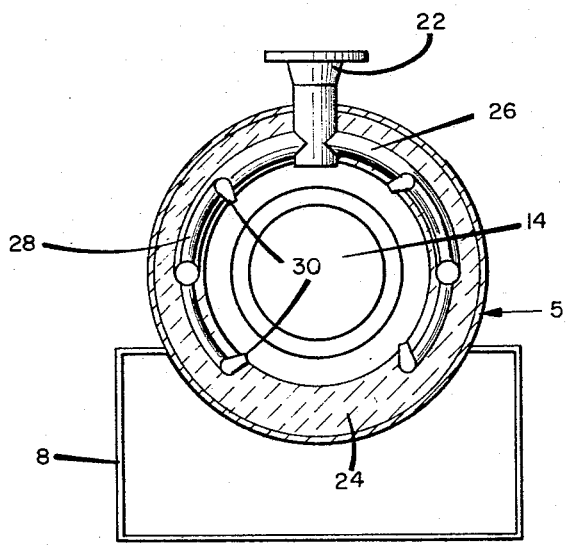
FIGURE 3 is a front end view of FIGURE 2 taken along line 3—3.

Referring again to FIGURE 1, a pair of firing tunnels 2 and 5 are affixed at one end to reactor boiler 9, feed tunnels and boiler resting on cradle supports 8 and 10, respectively. The firing tunnels are each equipped with gas inlets 12 and 14 and air inlets 16 and 18. A short distance downstream of the air inlets are supplemental or auxiliary gas inlets 20 and 22. The latter inlets each communicate with a gas distribution system inside or outside the tunnels. For the purpose of describing this feature we shall refer to FIGURES 2 and 3 showing partial longitudinal and vertical sectional views of tunnel 5 with a distributor system inside the tunnel. The structure within tunnel 2 is identical with that shown in the other. The lower end of gas inlet 22 is set in a suitable castable refractory material 24 and connects to conduit 26 leading to arms 28 having nozzles 30. These nozzles may be turned at an angle to impart a swirling motion to the gas stream flowing through the combustion chamber. Toward the rear of the tunnel and directly over support 32 is a checker work wall 34 which assures complete mixing of the reactant gases prior to passing from the narrow throat 36 which exhausts into reactor boiler 9.

Figure 5:
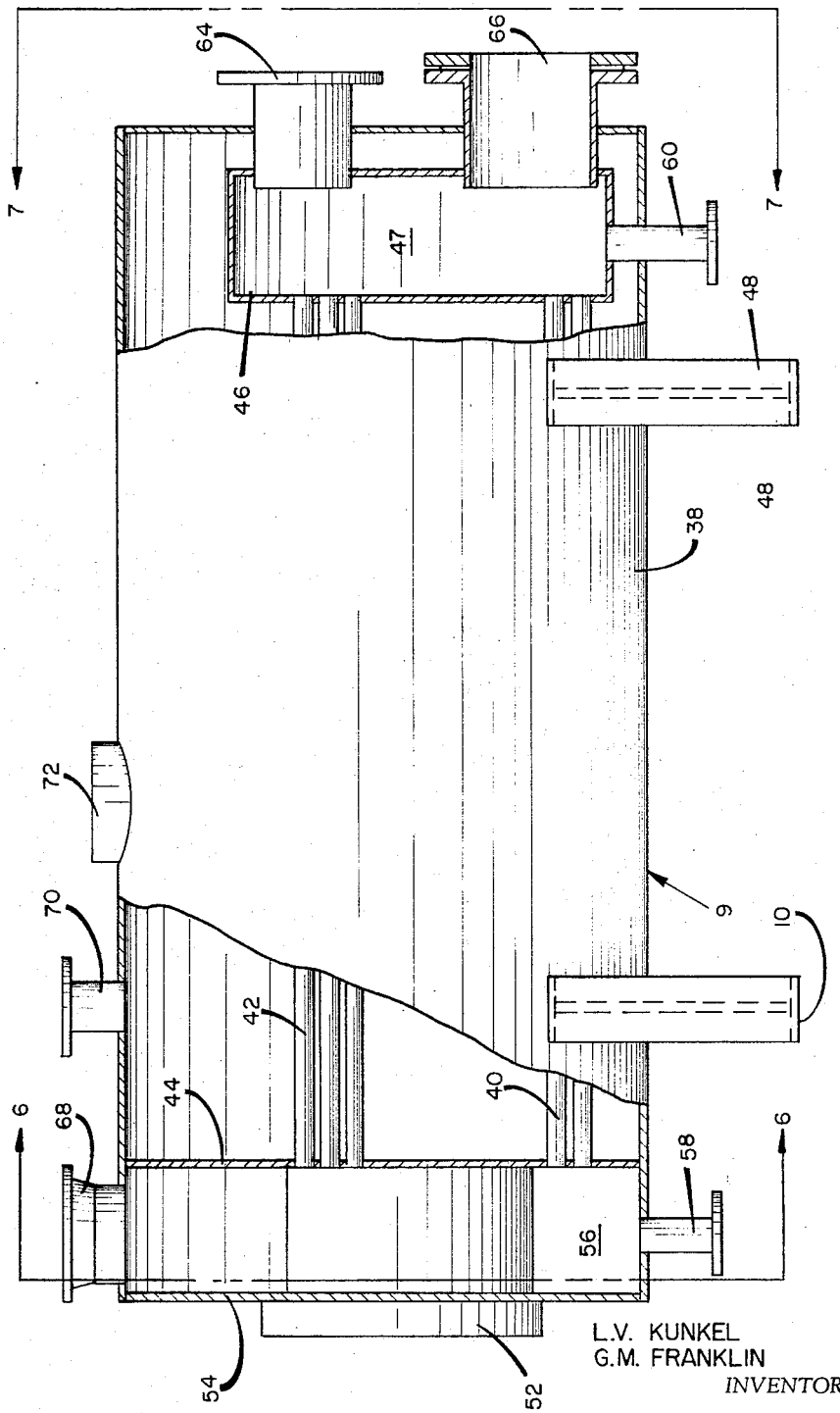
FIGURE 5 is an elevational view, partly in section, of the boiler connected to the aforesaid firing tunnels.
Figure 7:
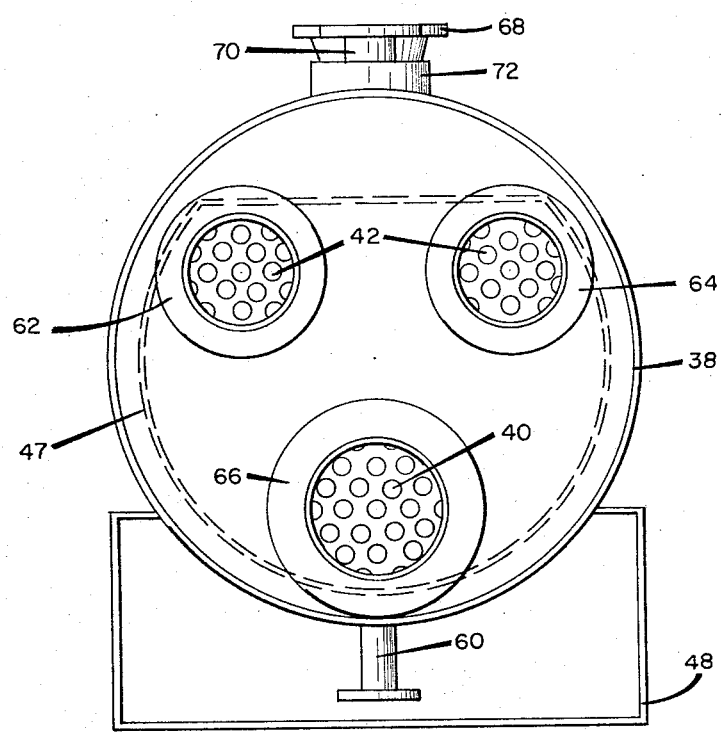
FIGURE 7 is a rear view of the boiler shown in FIGURE 5 taken along line 7—7.
Figure 6:
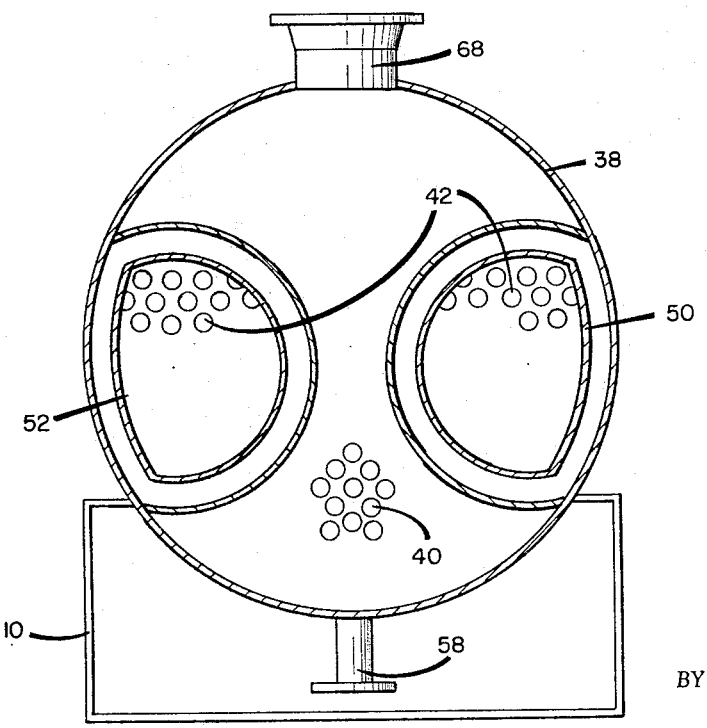
FIGURE 6 is a front end view of the boiler shown in FIGURE 5 taken along line 6—6.

FIGURE 5 is an elevational view of the reactor boiler, partly broken away, comprising a cylindrical shell 38 having two sets of cooling tubes 40 and 42 affixed to tube sheet 44 and to the back side 46 of water-cooled reversing chamber 47. The entire vessel rests on cradle supports 10 and 48. At the front of the vessel are two entrance ports 50 and 52 (see FIGURE 6) into which tunnels 2 and 5, respectively, discharge. Gases from tunnels 2 and 5 exhaust into tubes 42, but not into tube 40. Face plate 54 surrounds and aids in holding entrance ports 50 and 52 in place. Plate 54 is spaced ahead of tube sheet 44 to form a fluid-tight chamber 56. At the base of the chamber is a sulfur drain 58 by which free sulfur, discharged as vapor into chamber 47 and cooled in pipes 40, is removed from the boiler. Also, at the bottom of chamber 47 is a second sulfur drain 60 which removes any free sulfur condensed therein. To the rear of chamber 47 are vapor outlet ports 62 and 64. Positioned below and centrally of these two ports is manway 66. Both of said ports and manway 66 communicate with chamber 47.

At the top of chamber 56 is a reactant gas nozzle 68 and just to the right thereof is steam nozzle 70. Also on the top side of the boiler is manhole 72.

In operation of the above-described equipment—to give a typical example—acid gas at the rate of about 604 mols per hour containing 250 mols of $H_2S$, 321 mols of $CO_2$, 27 mols of water, and about 7 mols of $C_1$–$C_4$ hydrocarbon, is charged in equal amounts to firing tunnels 2 and 5 with approximately 40 percent of said gas passing through ports 12 and 14 and the balance going into the system via ports 20 and 22. The gas flowing into firing tunnels 2 and 5 via entrance ports 12 and 14 is mixed with 656 mols of air per hour. The resulting mixture then flows into the main body of the firing tunnels where said mixture is combined with the acid gas fed to the system via inlet ports 20 and 22, and ultimately nozzles 30. At this point the gaseous mixture present in both firing tunnels 2 and 5 is at a temperature of about 1700° F. and 19.5 p.s.i.a. Under these conditions approximately 65 to 70 percent of the total $H_2S$ fed to the system is converted to free sulfur in the main body of each of said tunnels. The resulting individual product gas mixtures are then fed into boiler 9 via entrance ports 50 and 52 where 264 p.s.i.a. steam is produced. Effluent from the reactor boiler 9 is withdrawn via vapor nozzle 68 at a temperature of about 650° F., passed through a conventional condenser (not shown), the resulting liquid sulfur withdrawn from the system at 375° F. (17.6 p.s.i.a.), and the uncondensed reactant gases sent to a first converter (not shown). However, before such gases enter said converter, they are blended with reheat gas flowing from vapor nozzle 62 at the rear of reactor boiler 9. The cool reactant gases and reheat gas from the boiler are so blended that the resulting mixture has a temperature of 440° F. (15.9 p.s.i.a.) before it enters the first converter. The gaseous reaction products from said converter which are at a temperature of about 545° F. (16.8 p.s.i.a.) are next condensed at a temperature of 375° F. (16.0 p.s.i.a.), liquid product sulfur separated, and the cool unreacted gases next blended with hot reheat gas flowing from vapor nozzle 64 to produce a gaseous reaction mixture flowing to a second converter (not shown), said mixture having a temperature of 440° F., (at 15.9 p.s.i.a.). The reaction products from said last-mentioned converter are withdrawn at a temperature of about 471° F. (15.7 p.s.i.a.), condensed and liquid sulfur at 305° F. (14.8 p.s.i.a.) separated from the system. Any unconverted gases are then sent to a conventional flare stack.

In the operation of the boiler, with the bulk of conversion of sulfur occurring therein, small amounts of liquid sulfur may condense in both chambers 56 and 47 and are withdrawn therefrom via drains 58 and 60, respectively. From an inspection of FIGURE 5 it will be seen that the reactant gases discharged from the firing tunnels enter tubes 42 with the partially cooled vapors and reacted gases flowing into chamber 47. Further cooling of effluent vapor occurs in tubes 40 with effluent from tubes discharging into chamber 56 and ultimately flowing out of the boiler via vapor outlet 68.

With the flow rates and operating conditions mentioned above and employing two catalytic converters, each containing a volume of catalysts corresponding to approximately 575 cubic feet, a total daily sulfur production of approximately 81 long tons is obtained for a recovery of about 94 percent.

It will be appreciated that the novel method of mixing $H_2S$-containing feed gas having normally poor combustibility characteristics may be employed when using one or more firing tunnels. In other words, such procedure may be used by itself or in combination with a dual firing tunnel arrangement which has been installed for the purpose of handling feed streams that are subject to widely varying throughput rates.

In the present claims the expression "$H_2S$ gas-containing stream of low combustibles content" is intended to mean a stream wherein the combustibles content is so low that it is impossible to maintain a kindling temperature in the boiler firing tube either with or without preheat of acid gas or air.

We claim:

1. A method for recovering free sulfur from an initial hydrogen sulfide-containing gas stream of low combustibles content, which comprises diverting through a burner about 40% of said stream together with sufficient oxygen to substantially completely convert about 75% of the hydrogen sulfide in said diverted stream to sulfur dioxide, discharging the resulting gaseous products from said burner into a reaction zone, thereafter introducing the remainder of said initial stream into said reaction zone via a path independent of that by which said gaseous products are discharged into said zone where sulfur dioxide and said remainder of said initial stream are thoroughly mixed at reaction temperature to form free sulfur in the absence of a catalyst, and withdrawing sulfur vapors thus produced from said reaction zone.

2. The method of claim 1 in which said reaction temperature ranges from about 1200° to about 2500° F.

3. A method for recovering free sulfur from a volume of hydrogen sulfide-containing gas of low combustibles content which comprises dividing said volume into a plurality of smaller streams, diverting about 40 percent of each of said smaller streams into a corresponding number of individual combustion zones, adding sufficient oxygen to the latter to substantially completely convert about 75 percent of the hydrogen sulfide in said smaller streams to sulfur dioxide, flowing the resulting streams of sulfur dioxide to a corresponding number of reaction zones, thereafter introducing the remainder of each of said smaller streams into a corresponding number of said reaction zones where sulfur dioxide and hydrogen sulfide in each of said zones are thoroughly mixed at reaction temperature to form free sulfur in the absence of a catalyst, and separating the resulting product sulfur produced in each of said reaction zones from the unconverted hydrogen sulfide and sulfur dioxide therein.

4. The method of claim 3 wherein the unconverted hydrogen sulfide and sulfur dioxide in each of said reaction zones is combined and contacted with a catalyst for the reaction of hydrogen sulfide with sulfur dioxide under reaction conditions to produce additional free sulfur.

5. The method of claim 3 wherein a number of combustion zones and a corresponding number of reaction zones are deactivated owing to the decrease in the flow rate of said hydrogen sulfide-containing gas while maintaining the flow of said hydrogen sulfide-containing gas to at least one of said combustion zones and the flow of hydrogen sulfide and sulfur dioxide to a corresponding number of said reaction zones, whereby maximum flexibility of said method at high conversion of hydrogen sulfide to free sulfur is realized.

References Cited by the Examiner
UNITED STATES PATENTS

| | | | |
|---|---|---|---|
| 1,083,249 | 12/1913 | Hall | 23—225 |
| 2,092,386 | 9/1937 | Baehr et al. | 23—225 |
| 2,742,347 | 4/1956 | Carlson | 23—225 |
| 2,834,653 | 5/1958 | Fleming et al. | 23—225 |
| 2,834,655 | 5/1958 | Chute et al. | 23—225 X |
| 2,835,559 | 5/1958 | Bahr | 23—288 |
| 2,836,481 | 5/1958 | Hofstede | 23—225 |
| 2,889,207 | 6/1959 | Eliot | 23—225 |

OSCAR R. VERTIZ, *Primary Examiner.*

MAURICE A. BRINDISI, *Examiner.*

E. STERN, R. M. DAVIDSON, A. J. GREIF,
*Assistant Examiners.*